July 18, 1944.　　　　H. A. STORCH　　　　2,353,943
VIBRATION DAMPENER
Filed June 15, 1942　　　　4 Sheets-Sheet 1

INVENTOR.
HAROLD A. STORCH
BY Kwis Hudson & Kent
ATTORNEYS

July 18, 1944.  H. A. STORCH  2,353,943
VIBRATION DAMPENER
Filed June 15, 1942  4 Sheets-Sheet 2

INVENTOR.
HAROLD A. STORCH
BY
Kwis Hudson & Kent
ATTORNEYS

July 18, 1944. H. A. STORCH 2,353,943
VIBRATION DAMPENER
Filed June 15, 1942 4 Sheets-Sheet 3
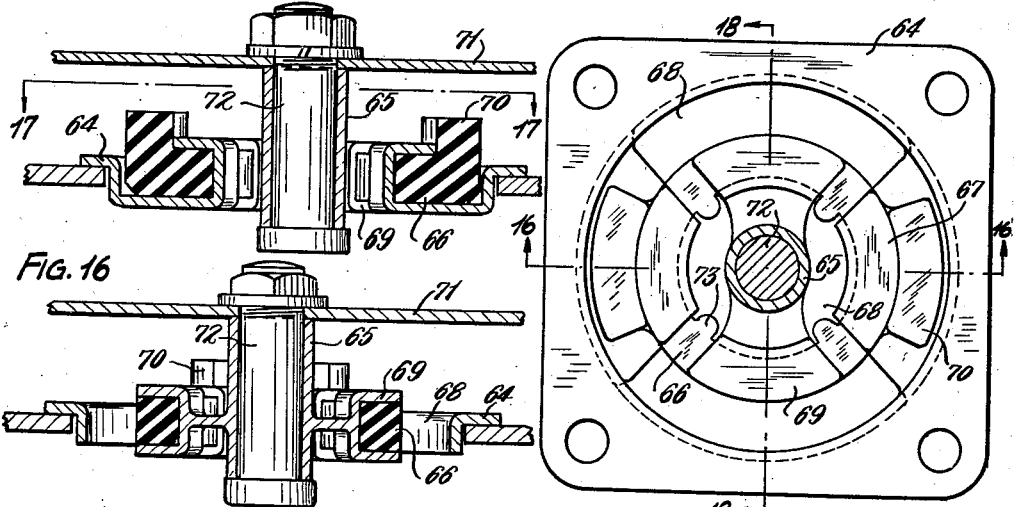
Fig. 16
Fig. 18
Fig. 17
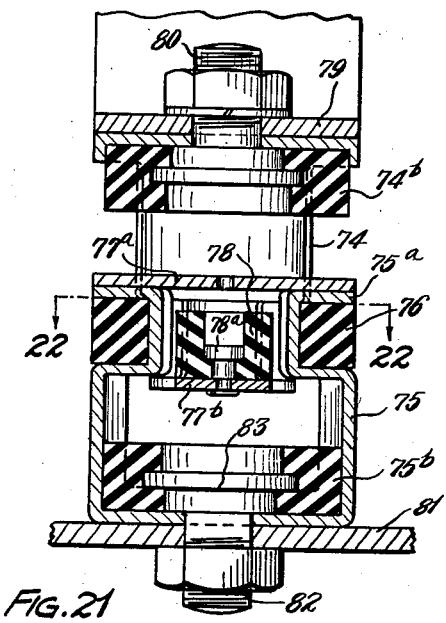
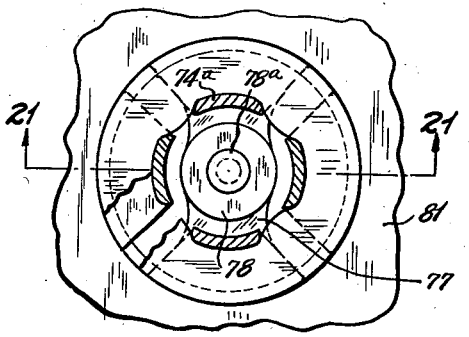
Fig. 21
Fig. 22
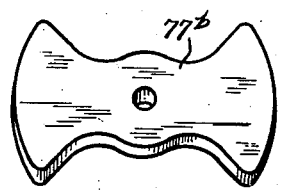
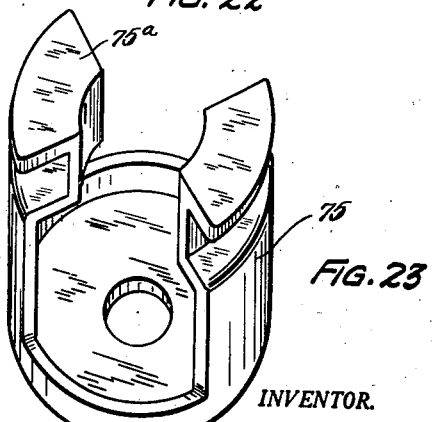
Fig. 24
Fig. 23
INVENTOR.
BY HAROLD A. STORCH
Kwis Hudson & Kent
ATTORNEYS July 18, 1944.　　　H. A. STORCH　　　2,353,943
VIBRATION DAMPENER
Filed June 15, 1942　　　4 Sheets-Sheet 4

INVENTOR.
HAROLD A. STORCH
BY
Kwis Hudson & Kent
ATTORNEYS

Patented July 18, 1944

2,353,943

UNITED STATES PATENT OFFICE 2,353,943

VIBRATION DAMPENER

Harold A. Storch, Birmingham, Mich., assignor to Harris Products Company, Cleveland, Ohio, a corporation of Ohio Application June 15, 1942, Serial No. 447,063

20 Claims. (Cl. 248—358)

This invention relates to spring devices of the kind used to form shock absorbing and vibration dampening mountings for instruments and various other bodies and aims to provide an improved and simplified construction for devices of this kind.

Another object of this invention is to provide an improved construction for vibration dampeners of this character wherein bumper means embodied in the device serves to limit the relative movement between the yieldably connected members of the device.

A further object of this invention is to provide an improved construction for vibration dampeners of this kind which can be readily adapted to different embodiments of these devices and which is so designed that the devices are relatively simple in form and inexpensive to manufacture and can be readily assembled and installed.

Other objects and advantages of the invention will be apparent from the following description when taken in conjunction with the accompanying sheets of drawings, in which.

Figures 1, 2:
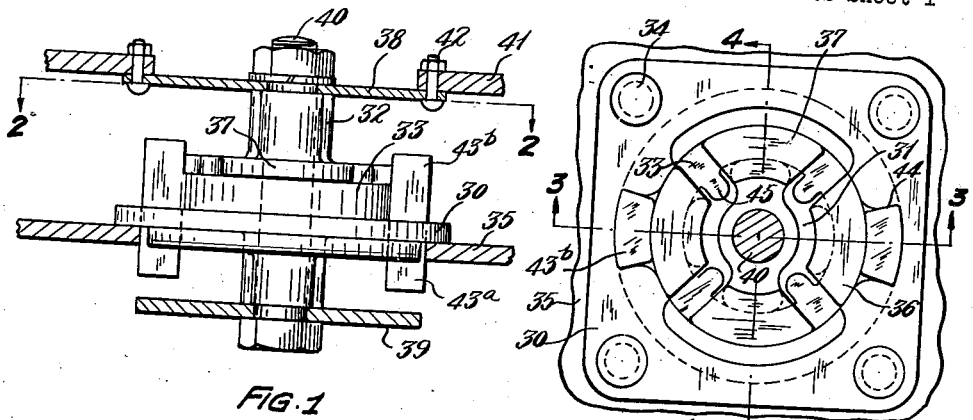
Fig. 1 is an elevational view, with certain parts in section, showing a vibration dampener constructed according to my invention.
Fig. 2 is a sectional plan view of the device taken as indicated by section line 2—2 of Fig. 1.
Figures 3, 4:
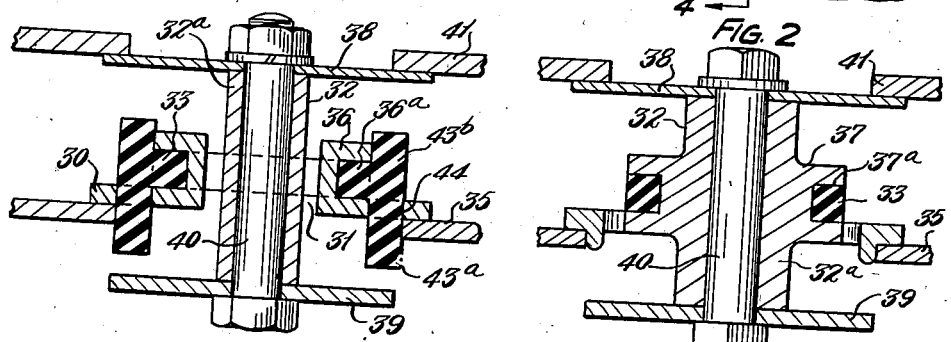
Figures 6, 7:
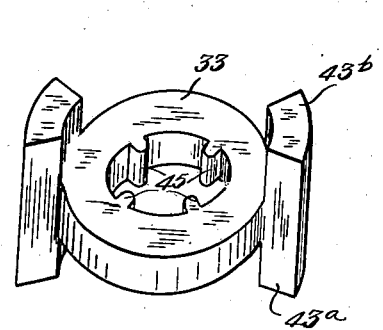
Figure 5:
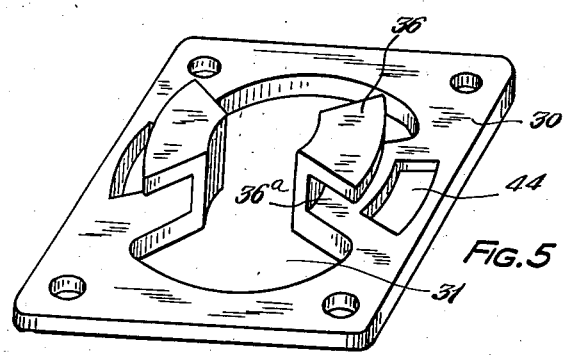
Figure 8:
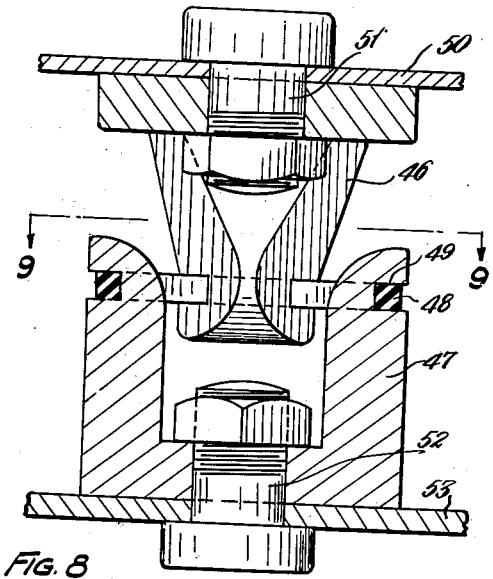
Figure 9:
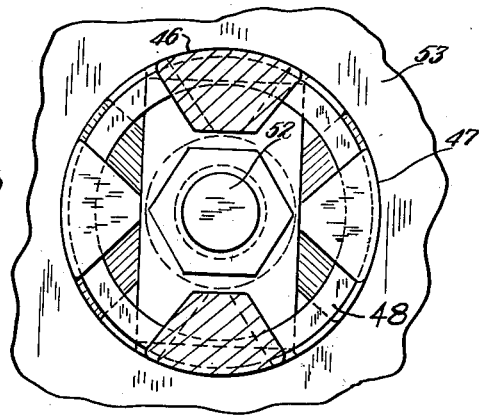
Figure 10:
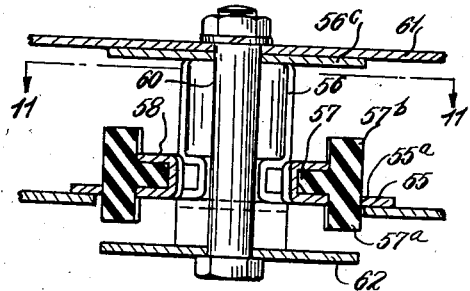
Figure 11:
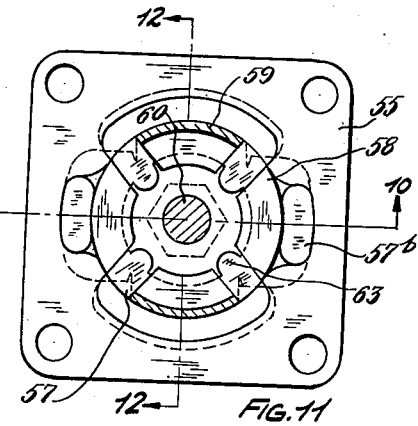
Figure 12:
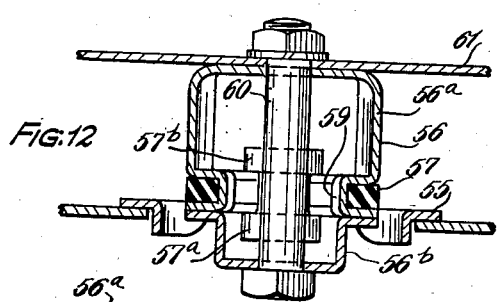
Figure 13:
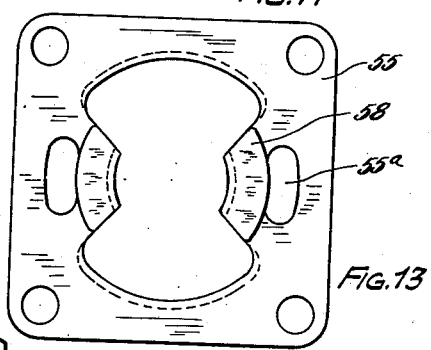
Figure 14:
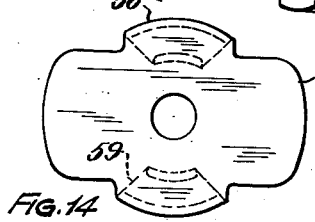
Figure 15:
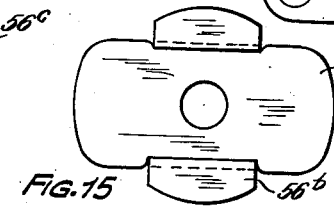
Figure 25:
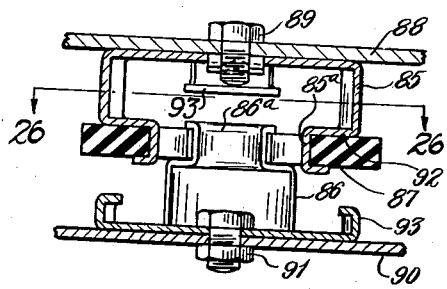
Figure 26:
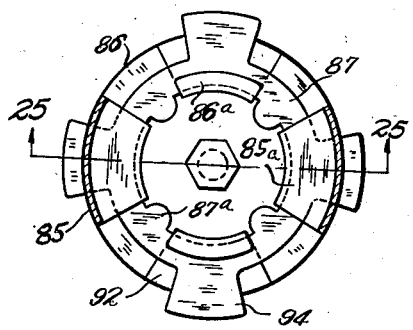
Figure 28:
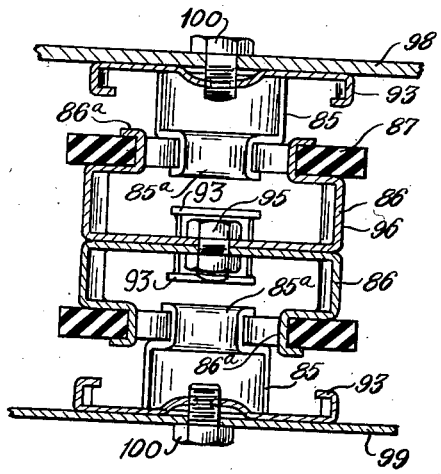
Figure 27:
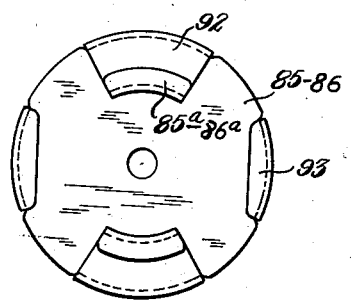
Figure 20:
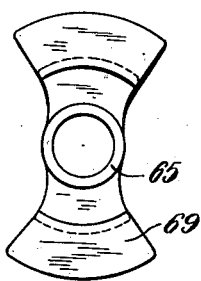
Figure 19:
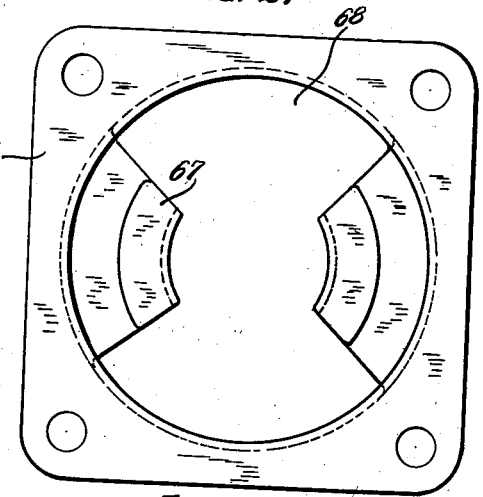

Figs. 3 and 4 are longitudinal sectional views taken through the device as indicated, respectively, by section lines 3—3 and 4—4 of Fig. 2;

Fig. 5 is a detached perspective view showing the plate member of the vibration dampener;

Fig. 6 is a similar view of the stem member of the device;

Fig. 7 is a detached perspective view of the resilient connecting member or rubber ring;

Fig. 8 is a longitudinal sectional view taken through another vibration dampener of my invention;

Fig. 9 is a transverse sectional view through this device taken on line 9—9 of Fig. 8;

Fig. 10 is a longitudinal sectional view taken through another vibration dampener constructed according to my invention, the view being taken on line 10—10 of Fig. 11;

Fig. 11 is a transverse sectional view taken through the device on line 11—11 of Fig. 10;

Fig. 12 is another longitudinal sectional view taken on line 12—12 of Fig. 11;

Fig. 13 is a plan view of the plate member of this device in detached relation;

Fig. 14 is a detached plan view of the upper section of the stem member of this device;

Fig. 15 is a detached plan view of the lower section of the stem member;

Fig. 16 is a longitudinal sectional view taken through still another vibration dampener of my invention, the view being taken on line 16—16 of Fig. 17;

Fig. 17 is a transverse sectional view of this device taken on line 17—17 of Fig. 16;

Fig. 18 is another longitudinal sectional view through the device taken on line 18—18 of Fig. 17;

Fig. 19 is a detached plan view of the plate member of this device;

Fig. 20 is a detached plan view of the stem member of this device;

Fig. 21 is a longitudinal sectional view showing still another vibration dampener of my invention;

Fig. 22 is a transverse sectional view thereof taken on line 22—22 of Fig. 21;

Fig. 23 is a detached perspective view showing one of the forked members used in this embodiment;

Fig. 24 is a perspective view showing one of the stop plates employed in this device;

Fig. 25 is a longitudinal sectional view taken through still another form of my vibration dampener, the view being taken on line 25—25 of Fig. 26;

Fig. 26 is a transverse sectional view of this device taken on line 26—26 of Fig. 25;

Fig. 27 is a detached plan view of one of the forked members of this device; and Fig. 28 is a longitudinal sectional view showing still another modification of my vibration dampener and which embodies features of the vibration dampener shown in Fig. 25.

The various different forms of my vibration dampener above referred to will be individually taken up and described in detail hereinafter, but before proceeding with such detailed description, I desire it to be understood that the invention is not limited to these particular forms but is applicable to various other modifications and embodiments.

In general my vibration dampener comprises a pair of cooperating members having intermeshing portions and a resilient ring formed of rubber or rubber-like material for flexibly connecting such members. One member of the pair may be adapted for connection with an instrument, or other object to be supported, and the other member of the pair may be adapted for connection with a panel or other support on which the instrument is to be mounted. As will be explained more in detail hereinafter, the resilient ring connects the paired members so as to permit relative movement therebetween for absorbing shocks and vibrations. Vibration dampening devices of the kind herein disclosed may be applied to a variety of uses, but are especially well suited for use on airplanes for mounting various instruments or other devices thereon so as to be protected from shocks and vibrations.

The vibration dampeners shown in the drawings and hereinafter described in detail can be divided into two groups. The dampeners shown in Figs. 1 to 4, inclusive, 10 to 12, inclusive, and 16 to 18, inclusive, may be conveniently referred to as dampeners of the plate and stem type because of the characteristics of their paired members. For a similar reason the vibration dampeners shown, respectively, in Figs. 8, 21, 25, and 28 may be conveniently referred to as being of the forked type.

Referring now more in detail to the vibration dampener illustrated in Figs. 1 to 4, inclusive, it will be seen that this device comprises in general a plate member 30 having a main opening 31 therein, a stem member or spider member 32 disposed in the main opening of the plate member, and a resilient ring 33 formed of rubber of rubber-like material and serving to connect the plate and stem members so as to permit relative movement therebetween and absorb shocks and vibrations.

The plate member 30 may be formed of suitable material such as metal or plastic and may be of any desired shape such as the quadrangular shape shown in this instance. The instrument or other object to be supported or mounted may be connected to this plate member by rivets 34 or the like and may be represented by the part 35. The plate member 30 has a plurality of upstanding arcuate projections or segments 36 thereon, in this instance two such projections, which may be formed as an integral part of this member and may be located in substantially opposed relation on opposite sides of the opening 31. The projections or segments 36 have external grooves 36a therein and, as shown in Fig. 3, these projections resemble a pair of opposed grooved radial arms or outwardly opening hook elements in which portions of the rubber ring 33 engage. In addition to the main opening 31, the plate member has relatively short arcuate openings 44 located just outwardly of the projections 36.

The stem or spider member 32 may comprise an elongated member also formed of metal or plastic and having a hollow stem portion 32a which extends coaxially through the opening of the plate member 30, as shown in Fig. 3. The stem member 32 has a plurality of substantially radially projecting arms 37, in this instance a pair of such arms, having external or outwardly opening grooves 37a in which portions of the rubber ring 33 engage. As will be seen from the drawings, the projections or arms 36 of the plate member 30 and the arms 37 of the stem member 32 are of segment-like shape, and when the stem member is disposed in the opening of the plate member, the arms 37 and the projections 36 are in intermeshing relation with clearance space therebetween. The two members are held in this relation by the resilient rubber ring 33 which engages in the grooves 36a and 37a and provides a yieldable connection between the members which will permit both a relative axial movement and a substantially universal relative rocking or tilting movement.

The stem member 32 may have a transverse bar or stop plate 38 at one end thereof and a second transverse bar or stop plate 39 at its other end. These transverse plates or bars may be connected with the stem member 32 by the bolt 40 extending therethrough. The plate member 38 also serves as a means for connecting the vibration dampener with a panel, frame or other support 41 with which the instrument or other member 35 is to be flexibly connected. The plate 38 may be connected with the panel 41 in any suitable manner, such as by the bolts 42 shown in this instance.

For limiting the relative movement between the plate and stem members 30 and 32, I may provide the device with bumper means which will serve to cushion and check excessive movement between these members. Such bumper means may be in the form of integral external projections or lugs 43a and 43b formed on the rubber ring 33 and extending axially of the device. In the vibration dampener shown in Figs. 1 to 4, inclusive, these integral lugs extend in both directions from the rubber ring 33, and when the parts are in their assembled relation, the depending lugs 43a extend downwardly through the openings 44 of the plate member 30. The depending lugs 43a form a yieldable bumper means which will engage the stop plate 39 and provide additional cushioning means if excessive movement occurs in the device, such as might be produced by the shock of a sudden landing of the airplane. If excessive movement in the opposite direction occurs, the upwardly projecting lugs 43b may come into cushioning engagement with the plate 38.

In addition to their function as a bumper means, the depending lugs 43a of the rubber ring 33 will, by their engagement in the openings 44 of the plate member 30, serve to hold this ring from shifting or creeping on the plate member. The rubber ring 33 also has internal teeth or projections 45 thereon engageable with the sides of the stem member 32 and which will hold the stem member substantially centrally of the opening 31 of the plate member 30.

The vibration dampener shown in Figs. 8 and 9 is of the above-mentioned forked type and comprises a pair of forked members 46 and 47 and a resilient ring 48 of rubber or rubber-like material connecting such members. The members 46 and 47 may be made of metal or of molded plastic material and are arranged in axial alignment with their forked ends in intermeshing relation with clearance space therebetween. These forked ends have an external groove 49 thereon in which the rubber ring 48 engages for flexibly connecting the members with each other. The rubber ring connects the forked members, but permits relative axial movement thereof as well as substantially universal tilting or swiveling movement and also serves to absorb shocks and vibrations. The members 46 and 47 may have any desired external shape, and in this instance, are of substantially circular or cylindrical form, as shown in Fig. 9.

One of the forked members, for example the member 46, may be connected with a panel 50 or other supporting structure by means of the bolt 51. The forked member 47 may be connected, as by the bolt 52, with an instrument or other object to be supported and which is here represented by the element 53.

In Figs. 10, 11, and 12 I show another vibration dampener which is generally similar to the device shown in Figs. 1 to 4, inclusive. This modified form of vibration dampener comprises in general a plate member 55, a hollow stem member 56 extending through an opening of the plate member, and a resilient rubber ring 57 connecting such members.

The plate member 55 has a pair of externally grooved segmental projections or radial arms 58 thereon, and the stem member 56 has a pair of externally grooved segmental portions or arms 59 in intermeshing relation with the projections 58 of the plate member. The plate member 55 may be of sheet metal and may be formed to the desired shape by the use of suitable dies or other apparatus. The hollow stem member 56 may also be made of sheet metal and for convenience of manufacture or other reasons may be made in two sections 56a and 56b which can be suitably connected in the coaxial arrangement shown in Fig. 12 by welding, soldering, or the like. A bolt 60 may extend through the stem member 56 for connecting the vibration dampener with a panel or other supporting structure 61. The lower section 56b of the stem member has laterally extending integral plate portions 62 which form a stop means adapted to be engaged by the bumper lugs 57a when excessive relative movement occurs. The upper section 56a of the stem member may have integral laterally extending plate portions 56c which form a stop means similar to the stop means 62. The rubber ring 57 engages in the grooved projections 58 and 59 and connects the plate and stem members 55 and 56 in a manner to permit relative axial and tilting movements and to absorb shocks and vibration.

Bumper means is also provided in this modified form of vibration dampener and may comprise integral external lugs 57a and 57b formed on the rubber ring for cooperation, respectively, with stop plates 62 and 56c if excessive relative movements occur in the device. The plate member 55 may be provided with openings 55a which are located just outwardly of the projections 58 and which accommodate the bumper lugs 57a of the rubber ring. The rubber ring may also have internal projections 63 similar to and for the same purpose as the projections 45 in Fig. 2.

Figs. 16 to 20, inclusive, show another form of my vibration dampener which also comprises plate and stem members 64 and 65 and a rubber ring 66 for connecting such members. The plate member 64 may be formed of sheet metal or other suitable material and has grooved projections or radial arms 67 thereon at opposite sides of the openings 68. The stem member 65 may be formed of metal as by die casting or may be molded from a suitable plastic. This member has oppositely extending grooved arms 69 in intermeshing relation with the projections 67 of the plate member 64. The rubber ring 66 engages in the grooved projections 67 and the grooved arms 69 and flexibly connects the stem and plate members with each other. This rubber ring may have integral bumper lugs 70 thereon adapted to engage the plate or panel 71 with which the vibration dampener is connected by the bolt 72 if excessive movement occurs in the device. The rubber ring may also have internal projections 73 for holding the ring against creeping and for locating the stem member 65 centrally of the opening 68 of the plate member 64.

It will be noted that the axial length of the vibration dampener of Figs. 16 to 20, inclusive, is considerably shorter than the dampeners of Figs. 1 to 7 and Figs. 10 to 15. This is an advantage for certain installations and is obtained by locating the grooved projections or arms 67 of the plate member 64 and the grooved arms 69 of the stem member 65 so that they are substantially axially centered with respect to the plane of the plate member. In other words, the grooved intermeshing arms 67 and 69 are axially offset so that they lie in the opening of the plate member instead of above the surface of this member.

Figs. 21 and 22 show another vibration dampener of the forked type comprising in general a pair of forked members 74 and 75 and a resilient rubber ring 76 connecting these members. The members 74 and 75 may be made of sheet metal or other suitable material and have pairs of externally grooved end portions 74a and 75a of segment-like form. The forked members are arranged in axial alignment and have their grooved portions disposed in intermeshing relation. The rubber ring 76 engages in the grooves of the end portions 74a and 75a and flexibly connects the two forked members.

Transverse stop plates or bars 77a and 77b may be welded or otherwise connected with the ends of the forked members 74 and 75 after these forked members have been brought into the intermeshing relation shown in Fig. 21. It will be observed that the bar 77a extends between the arms of the forked member 74 and is welded or otherwise connected with the segment portions 75a of the member 75. Similarly, the bar 77b extends between the arms of the forked member 75 and is welded or otherwise connected to the segment portions 74a of forked member 74.

In this form of my vibration dampener the bumper means comprises resilient rubber rings 74b and 75b located, respectively, in the base portions of the forked members 74 and 75 and a relatively smaller resilient rubber ring 78 located between the transverse bars 77a and 77b. This rubber ring 78 may be held in place by being connected with one of these transverse bars, for example, the bar 77b, by means of the rivet 78a. If excessive movement occurs between the forked members 74 and 75 as the result of a compressive force, the transverse bars 77a and 77b will engage, respectively, the bumper rings 74b and 75b to check and cushion such excessive movement. On the other hand, if the excessive movement is the result of a tension force acting to separate the forked members 74 and 75, the bumper ring 78 will be subjected to compression between the transverse bars 77a and 77b.

One end of this device, for example the forked member 74, may be connected with a panel or other support 79 by means of the bolt 80, and the other end of the device, represented by the forked member 75, may be connected with a portion 81 of an instrument or the like by means of the bolt 82. The bolts 80 and 82 are provided with shouldered heads 83 which also serve to retain the rubber rings 74b and 75b in place in the forked members.

In Fig. 25 I show another embodiment of my vibration dampener which is also of the forked type. This device comprises a pair of axially aligned forked members 85 and 86, and a resilient rubber ring 87 connecting such members. The forked members have pairs of grooved segment-like projections or hook portions 85a and 86a in which the rubber ring engages for flexibly connecting the forked members. The members 85 and 86 may be formed of sheet metal by the use of dies or other appropriate apparatus. The forked member 85 may be connected with a panel or other support 88 by means of the screw 89, and the forked member 86 may be connected with a portion 90 of an instrument or the like by means of the bolt 91. The rubber ring 87 may have internal lugs 87a thereon which serve to prevent relative arcuate shifting between the members 85 and 86.

As will be seen in Fig. 25 the grooved projections or segments 85a and 86a are offset inwardly toward the common axis of the device so as to leave exposed shoulder portions 92 on the forked members 85 and 86. At points substantially opposite the shoulder portions 92 the members 85 and 86 have stops 93 formed thereon and which are of a height to extend axially a desired distance toward the shoulders 92. The rubber ring 87 extends across the shoulders 92 and may have substantially radially projecting integral lugs which also overlie these shoulders. When excessive relative movement occurs between the members 85 and 86 either in an axial direction or as a tilting movement, one or both of the stop projections 93 will approach the shoulder portions 92 and will engage the bumper means formed by the overlying lugs 94 of the rubber ring.

It may be desirable to provide for greater flexibility than is afforded either in the vibration dampener of Fig. 25 or those shown in the other views of the drawings. In that case I may use two of the vibration dampeners shown in Fig. 25 and arrange them as shown in Fig. 28 so as to form a single vibration dampener having an increased length and considerably greater flexibility. In this modified arrangement it will be seen that two of the forked members 86 are disposed against each other and are clamped together by the bolt 95 to form a single intermediate member 96 having oppositely extending grooved segments or hook portions 86a. Forked members 85 may be used as end members having grooved segments or hook portions 85a extending in intermeshing relation with the grooved portions 86a of the intermediate member. Rubber rings 87 engage in the intermeshing grooved or hook portions and flexibly connect the end members 85 with the intermediate member 96. The end members 85 may be connected, respectively, with a panel or other support 98 and a portion 99 of an instrument or other object to be supported. For this purpose the end members 85 have openings in which the screws 100 have threaded engagement for holding such end members tightly against the parts 98 and 99.

Although Fig. 28 shows a vibration dampener which has been constructed out of two of the dampeners shown in Fig. 25, it will be understood, of course, that this same idea can be applied to all of the other forms of vibration dampeners herein disclosed, and in each case considerably increased flexibility can thus be obtained in these devices.

Throughout the specification and claims I have referred to rings formed of rubber or rubber-like material as the means for connecting the pairs of members, and in this connection I desire it to be understood that the material for these rings and herein referred to as "rubber" can be either natural rubber, or any one of the various forms of artificial or synthetic rubber or can be any other suitable rubber-like material having the necessary resiliency and flexibility. It should be understood also that in the use of my vibration dampeners the connections can be the reverse of those specified, that is, either member of the device can be connected with the support or bulkhead and the other member connected with the instrument or device to be supported.

From the foregoing description and the accompanying drawings, it will now be readily understood that I have provided an improved form of vibration dampener which, although of very simple and economical construction, is very strong and durable and provides an efficient and satisfactory means for mounting instruments on airplanes and for various other purposes where the ability of the mounting means to absorb shocks and vibrations is of prime consideration.

While I have illustrated and described my improved vibration dampener and its various modifications in considerable detail, it will be understood, of course, that I do not wish to be limited to the particular forms of construction and arrangements of parts herein disclosed, but regard my invention as including such changes and modifications as do not constitute a departure from the spirit of the invention and the scope of the appended claims.

Having thus described my invention, I claim:

1. A vibration dampener comprising a pair of substantially coaxially disposed members having arm portions extending into intermeshing relation with clearance space therebetween, one of said members being adapted for connection with a body to be supported and the other for connection with a panel or the like, a resilient rubber ring engaging the intermeshing arm portions so as to form a yieldable connection between said members, and resilient bumper means arranged to limit the relative movement between said members.

2. A vibration dampener comprising a pair of substantially coaxially disposed members having arm portions extending into intermeshing relation with clearance space therebetween, one of said members being adapted for connection with a body to be supported and the other for connection with a panel or the like, and a resilient rubber ring engaging the intermeshing arm portions so as to form a yieldable connection between said members, said rubber ring having integral projections thereon forming bumpers for limiting the relative movement between said members.

3. A vibration dampener comprising a pair of coaxially disposed members having arm portions extending into intermeshing relation with clearance space therebetween, one of said members being adapted for connection with a body to be supported and the other for connection with a panel or the like, and a resilient rubber ring engaging the intermeshing arm portions so as to form a yieldable connection between said members, said rubber ring having integral axial projections thereon of a length to form bumpers for limiting the relative movement between said members.

4. A vibration dampener comprising a pair of coaxially disposed members having externally grooved forked ends in intermeshing relation with intervening clearance space, and a resilient rubber ring engaging in the grooves of said forked ends and providing a flexible connection between said members, said rubber ring having bumper portions adapted to be subjected to compression between portions of said members for limiting relative movement therebetween.

5. A vibration dampener comprising a pair of coaxially disposed members having externally grooved portions in intermeshing relation with clearance space therebetween, and a rubber ring engaging in the grooves of the intermeshing portions and providing a yieldable connection between said members, said members having substantially opposed shoulder portions thereon and said rubber ring having bumper portions between said shoulder portions.

6. A vibration dampener comprising a pair of coaxially disposed members having externally grooved portions in intermeshing relation with clearance space therebetween, and a rubber ring engaging in the grooves of the intermeshing portions and providing a yieldable connection between said members, said members having substantially opposed shoulder portions thereon outwardly of said grooved portions and said rubber ring having integral radial projections forming resilient bumper portions between said opposed shoulder portions.

7. A vibration dampener comprising a pair of coaxially disposed members one of which has an opening therein and grooved portions adjacent the opening and the other of which extends through said opening and has grooved portions in intermeshing relation with the grooved portions of said one member, and a rubber ring engaging in said grooved portions and providing a resilient connection between said members.

8. A vibration dampener comprising a pair of coaxially disposed members one of which has an opening therein and grooved portions adjacent the opening and the other of which extends through said opening and has grooved portions in intermeshing relation with the grooved portions of said one member, and a rubber ring engaging in said grooved portions and providing a resilient connection between said members, said rubber ring having integral projections thereon forming bumpers for limiting the relative movement between said members.

9. A vibration dampener comprising a pair of coaxially disposed members one of which has an opening therein and grooved arcuate segments on opposite sides of said opening and the other of which extends through said opening and has substantially radially projecting grooved arcuate segments in intermeshing relation with the first-mentioned arcuate segments, and a rubber ring engaging in the grooved segments and providing a resilient connection between said members.

10. In a device of the character described a member having a stem and grooved arms projecting therefrom, a plate-like member having an opening through which said stem extends and having grooved projections in intermeshing relation with said arms, a rubber ring engaging in the grooved arms and projections and providing a yieldable connection therebetween, said rubber ring having integral axial projections thereon, and laterally projecting stop means on said stem adapted to be engaged by the projections of the rubber ring for limiting the relative movement between said members.

11. A vibration dampener comprising a pair of coaxially disposed members one of which is a plate-like member having a main opening therein and the other of which extends through said main opening, said plate-like member having a pair of upstanding grooved projections on opposite sides of said main opening and other openings outwardly of said projections, said other member having grooved arms in intermeshing spaced relation to said grooved projections and a transverse stop portion spaced from said plate-like member, and a rubber ring engaging in said grooved projections and said grooved arms and providing a resilient connection between said members, said rubber ring having bumper elements extending through said other openings for cooperation with said stop portion of said other member.

12. A vibration dampener comprising a pair of forked members having grooved portions extending into intermeshing relation, a rubber ring engaging in said grooved portions for flexibly connecting said members, a stop bar connected with each forked member adjacent its inner end and extending transversely between the arms of the other forked member, and a resilient bumper element disposed between such stop bars.

13. A vibration dampener comprising a pair of forked members having grooved portions extending into intermeshing relation, a rubber ring engaging in said grooved portions for flexibly connecting said members, a stop bar connected with each forked member adjacent its inner end and extending transversely between the arms of the other forked member, and resilient bumper elements located in said forked members to be engaged by said stop bars for limiting the relative movement between said members.

14. A vibration dampener comprising a pair of coaxially disposed members one of which has an opening therein and arcuately grooved radial arm portions on opposite sides of the opening and the other of which extends through said opening and has arcuately grooved radial arm portions in intermeshing relation with the grooved arm portions of said one member, and a rubber ring engaging in said grooved arm portions and providing a resilient connection between said members, said ring permitting relative axial shifting and substantially universal relative tilting between said members.

15. A vibration dampener comprising a pair of forked members having grooved portions extending into intermeshing relation, a rubber ring engaging in said grooved portions for flexibly connecting said members, a stop bar connected with each forked member adjacent its inner end and extending transversely between the arms of the other forked member, a resilient bumper element disposed between such stop bars for cushioning and limiting relative axial separating movement between the members, and resilient bumper elements located in said forked member for cushioning and limiting relative movement of the members toward each other.

16. A vibration dampener comprising a pair of coaxially disposed members one of which is a plate member having an opening therein and grooved arm portions extending radially in said opening and the other of which extends through said opening and has grooved arm portions extending radially in said opening in intermeshing relation with the grooved arm portions of said plate member, and a rubber ring engaging in the grooved arm portions and providing a resilient connection between said members, said arm portions being substantially axially centered with respect to the plane of said plate member.

17. A vibration dampener comprising a plate member having an opening therein, a spider member extending through said opening, said members having arcuately grooved radial arm portions extending into intermeshing relation with clearance therebetween, and a rubber ring engaging the intermeshing arm portions and forming a yieldable connection between said members, said rubber ring having integral bumper elements thereon adapted to be subjected to compression by cooperating portions of said members for limiting relative movement between the members.

18. A vibration dampener comprising a plate member having an opening therein, a spider member extending through said opening, said members having arcuately grooved radial arm portions extending into intermeshing relation, and a rubber ring engaging said arm portions and forming a resilient connection between said members, one of said members having stop portions projecting laterally into overlapping relation with the other member and said rubber ring having integral bumper portions adapted to cooperate with said stop portions for limiting relative movement between the members.

19. A vibration dampener comprising a plate member having an opening therethrough and hook elements extending into said opening, a spider member having a stem extending through said opening and grooved arms in intermeshing relation with said hook elements, and a rubber ring engaging in said hook elements and grooved arms and providing a resilient connection between said members.

20. A vibration dampener comprising a plate member having an opening therethrough and hook elements extending into said opening, a spider member having a stem extending through said opening and grooved arms in intermeshing relation with said hook elements, a rubber ring engaging in said hook elements and grooved arms and providing a resilient connection between said members, and means for limiting relative movement between said members comprising integral bumper elements on said rubber ring and stop elements on said stem adapted to be engaged by said bumper elements.

HAROLD A. STORCH.